US009753561B2

(12) United States Patent
Lee et al.

(10) Patent No.: US 9,753,561 B2
(45) Date of Patent: Sep. 5, 2017

(54) DISPLAY APPARATUS, CONTROL METHOD THEREOF, INPUT APPARATUS, AND DISPLAY SYSTEM

(71) Applicant: SAMSUNG ELECTRONICS CO., LTD., Suwon-si (KR)

(72) Inventors: Dong-heon Lee, Seoul (KR); Yong-hwan Kwon, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 186 days.

(21) Appl. No.: 13/735,209

(22) Filed: Jan. 7, 2013

(65) Prior Publication Data
US 2013/0176229 A1 Jul. 11, 2013

(30) Foreign Application Priority Data

Jan. 6, 2012 (KR) .................. 10-2012-0001860

(51) Int. Cl.
G06F 3/02 (2006.01)
G09G 5/00 (2006.01)
G06F 3/041 (2006.01)
H04N 21/422 (2011.01)
H04N 21/482 (2011.01)
H04N 21/485 (2011.01)

(52) U.S. Cl.
CPC ....... *G06F 3/041* (2013.01); *H04N 21/42224* (2013.01); *H04N 21/482* (2013.01); *H04N 21/485* (2013.01)

(58) Field of Classification Search
CPC .............. G06F 3/041; H04N 21/42224; H04N 21/482; H04N 21/485

USPC ......................................... 345/173, 156, 169
See application file for complete search history.

(56) References Cited

U.S. PATENT DOCUMENTS 6,765,557 B1    7/2004  Segal et al.
2003/0071855 A1  4/2003  Kim
(Continued)

FOREIGN PATENT DOCUMENTS

JP    2003-530772 A    10/2003
JP    2003-348371 A    12/2003
(Continued)

OTHER PUBLICATIONS

Communication dated Apr. 18, 2013 issued by the European Patent Office in counterpart European Patent Application No. 13150176.9.
(Continued)

Primary Examiner — Mark Regn
(74) Attorney, Agent, or Firm — Sughrue Mion, PLLC

(57) ABSTRACT

A display apparatus including: a display unit; an image processor which processes an image signal to display an image on the display unit; a communication unit which communicates with an input apparatus including a button and a touch pad; and a controller which controls the image processor to display a first item corresponding to a current setting state of the display apparatus in response to a first input from the input apparatus through manipulation of the button and to display at least one second item to be selected to change the current setting state on the display unit in response to a second input from the input apparatus through the touch pad, subsequent to the first input.

17 Claims, 9 Drawing Sheets

(56) References Cited

U.S. PATENT DOCUMENTS

| | | | |
|---|---|---|---|
| 2004/0041723 A1* | 3/2004 | Shibamiya et al. | 341/176 |
| 2004/0263377 A1* | 12/2004 | Risi et al. | 341/175 |
| 2005/0140662 A1 | 6/2005 | Jayanetti et al. | |
| 2005/0235209 A1* | 10/2005 | Morita | G06F 3/0482 715/716 |
| 2009/0284468 A1 | 11/2009 | Takaki | |
| 2010/0079794 A1 | 4/2010 | Kim | |
| 2010/0153999 A1* | 6/2010 | Yates | H04N 5/44543 725/39 |
| 2010/0241993 A1 | 9/2010 | Chae | |
| 2011/0267291 A1 | 11/2011 | Choi et al. | |

FOREIGN PATENT DOCUMENTS

| | | |
|---|---|---|
| JP | 2011129148 A | 6/2011 |
| KR | 1020100035507 A | 4/2010 |

OTHER PUBLICATIONS

Communication issued on Mar. 5, 2015 by the European Patent Office in related Application No. 13150176.9.
Communication issued on Jan. 5, 2016 by the European Patent Office in related Application No. 13150176.9.
Communication dated Aug. 1, 2016, issued by the Japanese Patent Office in counterpart Japanese Patent Application No. 2013-000128.
Communication dated Nov. 11, 2016, issued by the European Patent Office in counterpart European Application No. 13150176.9.
Communication dated Dec. 26, 2016, issued by the State Intellectual Property Office of P.R. China in counterpart Chinese Application No. 201310002317.4.
European Office Action corresponding to European Patent Application No. 13150176.9, dated May 30, 2017.
Chinese Office Action corresponding to Chinese Patent Application No. 201310002317.4, dated Jul. 13, 2017.

* cited by examiner

DISPLAY APPARATUS, CONTROL METHOD THEREOF, INPUT APPARATUS, AND DISPLAY SYSTEM

CROSS-REFERENCE TO RELATED APPLICATION

This application claims priority from Korean Patent Application No. 10-2012-0001860, filed on Jan. 6, 2012 in the Korean Intellectual Property Office, the disclosure of which is incorporated herein by reference.

BACKGROUND

1. Field

Apparatuses and methods consistent with the exemplary embodiments relate to a display apparatus processing an image signal to display an image, a control method thereof, an input apparatus and a display system, and more particularly to a display apparatus controlling an image display mode based on manipulation of an input apparatus by a user, a control method thereof, an input apparatus and a display system.

2. Description of the Related Art

A display apparatus is a device which processes an image signal/image data input from an external image source or autonomously stored and displays an image based on the image signal. A display apparatus available to general users is configured as a TV or a monitor. For example, a display apparatus configured as a TV conducts various processes, such as tuning and decoding, on a broadcast signal received from the outside, thereby providing an image of a broadcast channel desired by a user.

A display apparatus includes an input apparatus which enables a user to set a function optionally with respect to various functions including a method of processing a provided image. The input apparatus may be installed on an outside of the display apparatus or be provided as a separate device from the display apparatus. In the latter case, the input apparatus includes a remote controller.

Here, in view of manipulation by a user, the input apparatus may have various forms of input units, e.g., a plurality of keys/buttons pressed or toggled by the user. When the user manipulates a button, the input apparatus generates and transmits a control signal corresponding to the button to the display apparatus. Accordingly, the display apparatus performs a preset control operation corresponding to the control signal received from the input apparatus.

SUMMARY

Accordingly, one or more exemplary embodiments provide a display apparatus based on touch input to provide useful functions and a control method thereof.

According to an aspect of an exemplary embodiment, there is provided a display apparatus including: a display unit; an image processor processing an image signal to display an image on the display unit; a communication unit communicating with an input apparatus including a button and a touch pad; and a controller controlling the image processor to display a first item related to a current setting state of the display apparatus corresponding to the button on the display unit when receiving a signal corresponding to a first input from the input apparatus through manipulation of the button and to display at least one second item to be selected to change the current setting state on the display unit when receiving a signal corresponding to a second input from the input apparatus through the touch pad, subsequent to the signal corresponding to the first input.

The controller may switch to any one selected and displayed among the first item and the at least one second item corresponding to a drag motion when the drag motion is made on the touch pad by a user while the second item is displayed.

The controller may perform a preset control operation of the display apparatus corresponding to any one item when the one item is selected among the first item and the at least one second item.

The controller may continue to display the first item while the button is manipulated by the user.

The second input may be made through a touch motion of the user on the touch pad.

According to an aspect of another exemplary embodiment, there is provided a control method of a display apparatus including: communicating with an input apparatus including a button and a touch pad; displaying a first item related to a current setting state of the display apparatus corresponding to the button when receiving a signal corresponding to a first input from the input apparatus through manipulation of the button; and displaying at least one second item to be selected to change the current setting state when receiving a signal corresponding to a second input from the input apparatus through the touch pad, subsequent to the signal corresponding to the first input.

The displaying the second item may include switching to any one selected and displayed among the first item and the at least one second item corresponding to a drag motion when the drag motion is made on the touch pad by a user while the second item is displayed.

The switching to any one selected and displayed among the first item and the at least one second item may include performing a preset control operation of the display apparatus corresponding to any one item when the one item is selected among the first item and the at least one second item.

The displaying the first item may include continuing to display the first item while the button is manipulated by the user.

The second input may be made through a touch motion of the user on the touch pad.

According to an aspect of an exemplary embodiment, there is provided an input apparatus of a display apparatus including: an input unit including a button and a touch pad; a communication unit communicating with the display apparatus; and a controller transmitting a signal corresponding to a first input through the communication unit so that a first item related to a current setting state of the display apparatus corresponding to the button is displayed on the display apparatus when the first input is made according to manipulation of the button, and transmitting a signal corresponding to a second input through the communication unit, subsequent to the signal corresponding to the first input, so that at least one second item to be selected to change the current setting state is displayed on the display apparatus when the second input is made through the touch pad, subsequent to the first input.

According to an aspect of an exemplary embodiment, there is provided a display system including: a display apparatus; and an input apparatus including a button and a touch pad and transmitting a preset control signal to control an operation of the display apparatus according to manipulation of the button or the touch pad, wherein a first item related to a current setting state of the display apparatus corresponding to the button is displayed on the display apparatus according to a first input by manipulation of the button, and at least one second item to be selected to change the current setting state is displayed on the display apparatus according to a second input through the touch pad, subsequent to the first input.

In accordance with exemplary embodiments described above, a display apparatus based on touch input provides useful functions.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
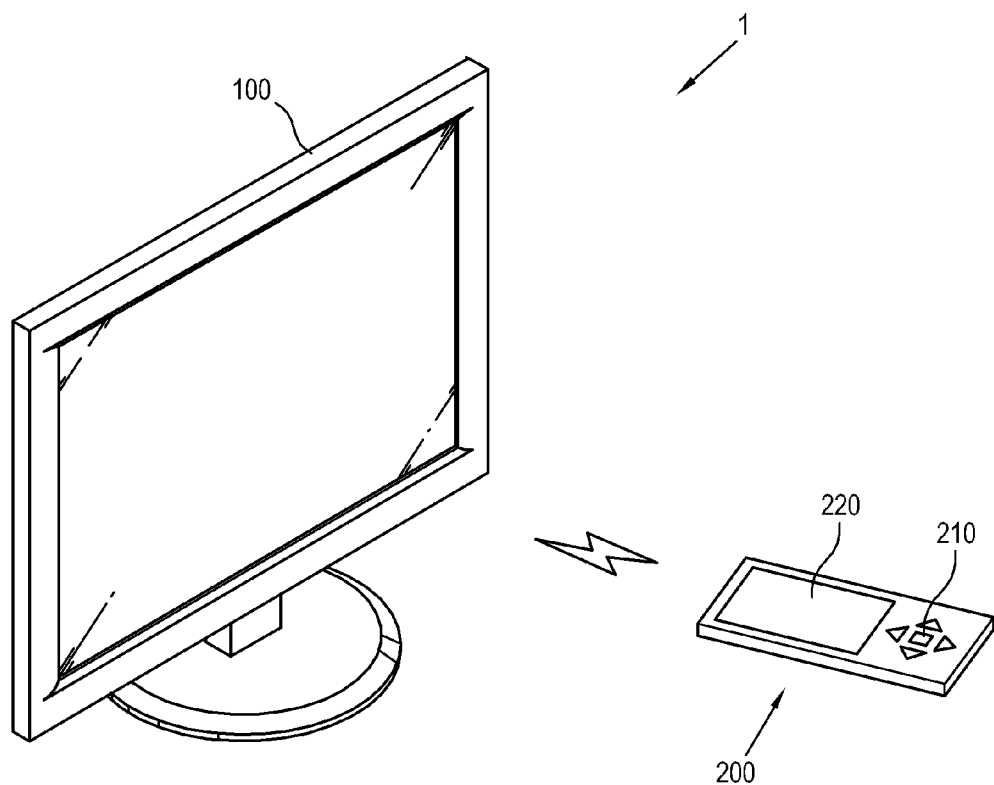
FIG. 1 shows an illustrative example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 shows an illustrative example of a display system 1 according to an exemplary embodiment.

As shown in FIG. 1, the display system 1 according to the exemplary embodiment includes a display apparatus 100 processing an image signal according to a preset image processing process to display an image and an input apparatus 200 generating and transmitting a preset command/ data/information/signal to the display apparatus 100 so as to remotely control various operations of the display apparatus 100.

In the exemplary embodiment, the display apparatus 100 is configured as a TV capable of independently displaying an image based on an image signal/image data/image information received from an external image source (not shown) or autonomously stored, and the input apparatus 200 is configured as a remote controller.

However, the present exemplary embodiment may be modified variously, without being limited to the foregoing configuration. For example, the display apparatus 100 may be configured as a monitor connected to a main computer (not shown), and the input apparatus 200 may be configured as a system communicating with the computer monitor. That is, the following exemplary embodiment is provided for illustrative purpose only but does not limit the scope of the present exemplary embodiments.

The display apparatus 100 may display any type of image, without being particularly limited, for example, a video, a still image, an application, an on-screen display (OSD), a graphic user interface (GUI) to control various operations, or the like.

The input apparatus 200 is an external device which is capable of communicating with the display apparatus 100 wirelessly and is manipulated and held by a user. The input apparatus 200 transmits a command or control signal preset corresponding to user manipulation to the display apparatus 100. Here, the input apparatus 200 may include various types of input units 210 and 220 enabling user manipulation to generate such a command. In the present exemplary embodiment, the input units 210 and 220 respectively include a button 210 pressed or toggled by the user and a touch pad 220 touched by the user.

The input apparatus 200 generates various commands preset corresponding to manipulation types by the user on the button 210 or the touch pad 220 and transmits the generated commands to the display apparatus 100. The display apparatus 100 performs a control operation corresponding to a received command from the input apparatus 200.

Figure 2:
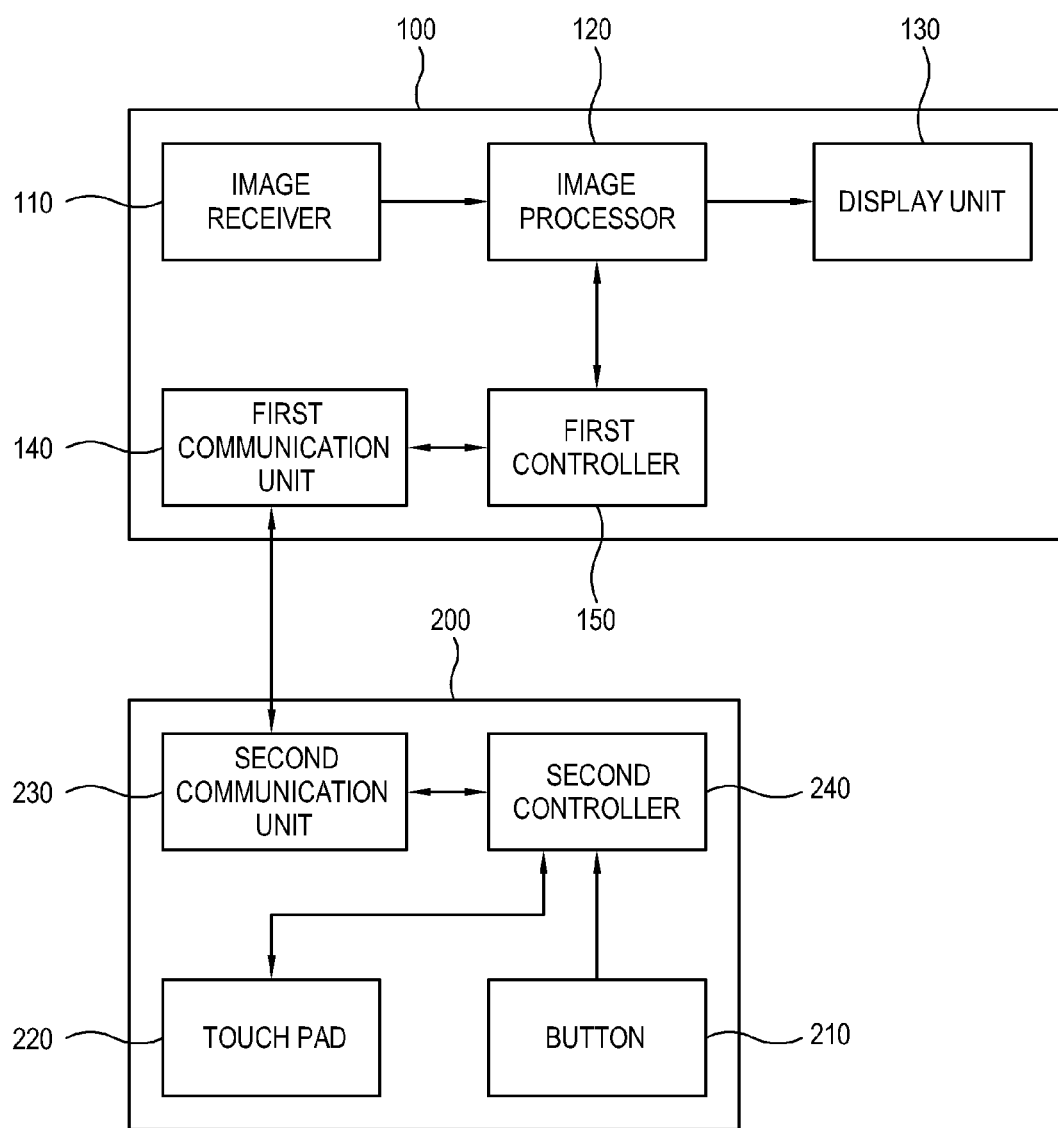
FIG. 2 is a block diagram of the display system of FIG. 1.

Hereinafter, the display apparatus 100 and the input apparatus 200 will be described in detail as to configuration with reference to FIG. 2. FIG. 2 is a block diagram illustrating configurations of the display apparatus 100 and the input apparatus 200.

As shown in FIG. 2, the display apparatus 100 includes an image receiver 110 receiving an image signal, an image processor 120 processing an image signal received by the image receiver 110, a display unit 130 displaying an image based on an image signal processed by the image processor 120, a communication unit 140 communicating with the input apparatus 200 and a first controller 150 controlling all components of the display apparatus 100. First controller 150 may be a hardware processor such as a central processing unit (CPU).

The input apparatus 200 includes the input units 210 and 220 having the button 210 and the touch pad 220 manipulated by the user, a second communication unit 230 communicating with the first communication unit 140 of the display apparatus 100, and a second controller 240 controlling all components of the input apparatus 200. Second controller 240 may be a hardware processor such as a central processing unit (CPU).

Hereinafter, the configuration of the display apparatus 100 is described in detail.

The image receiver 110 receives an image signal (through a wireless connection, a wired connection, over a network, etc.) from an image source (not shown) and transmits the signal to the image processor 120. The image receiver 110 may be configured as various types corresponding to standards of received image signals and types of the display apparatus 100. For example, the image receiver 110 may receive a digital image signal in accordance with high definition multimedia interface (HDMI), Video Graphics Array (VGA), Digital Video Interface (DVI), S-Video, component, composite, a stream of image data packets from a streaming server (not shown), etc.

The image processor 120 performs various preset image processing processes on an image signal received from the image source 110. The image processor 120 outputs a processed image signal to the display panel 130, so that an image based on the corresponding image signal is displayed on the display panel 130.

The image processor 120 may perform any kind of image processing, without being limited to, for example, decoding corresponding to an image format of an image signal, de-interlacing to convert an interlaced image signal into a progressive form, scaling to adjust an image signal to a preset resolution, noise reduction to improve image quality, detail enhancement, frame refresh rate conversion, etc.

The image processor 120 may be provided as an integrated multi-functional component, such as a system on chip (SOC), or as an image processing board (not shown) formed by mounting separate components which independently conduct individual processes on a printed circuit board.

The display unit 130 displays an image based on an image signal output from the image processor 120. The display unit 130 may be configured in various display modes using liquid crystals, plasma, light emitting diodes, organic light emitting diodes, a surface conduction electron emitter, a carbon nano-tube, nano-crystals, etc., without being limited thereto.

The display unit 130 may further include an additional component depending on its display mode. For example, when the display unit 130 is configured in a display mode using liquid crystals, the display unit 130 includes a liquid display panel (not shown), a backlight unit (not shown) providing light to the display panel and a panel driving board (not shown) driving the panel.

The first communication unit 140 transmits a command/data/information/signal received from the input apparatus 200 to the first controller 150. In the present exemplary embodiment, the first communication unit 140 performs one-way communication that is receiving a signal from the input apparatus 200. However, the first communication unit 140 may transmit a command/data/information/signal transmitted from the first controller 150 to the input apparatus 200. In this case, the first communication unit 140 follows wireless communication standards, such as radio frequency (RF), ZIGBEE™ and Bluetooth, to perform two-way communication between the display apparatus 100 and the input apparatus 200.

The first controller 150 controls an operation of the display apparatus 100 corresponding to a command transmitted to the first communication unit 140. For example, when receiving a preset command from the input apparatus 200 through the first communication unit 140, the first controller 150 controls the image processor 120 to perform an image processing operation corresponding to the command. In the present exemplary embodiment, the controller 150 and the image processor 120 are described as separate components. However, the controller 150 and the image processor 120 may be configured as a single image processing board (not shown).

Hereinafter, the configuration of the input apparatus 200 is described in detail.

At least one button 210 is installed on an outside of the input apparatus 200. The button 210 is pressed by the user to transmit a corresponding signal to the second controller 240, and accordingly the second controller 240 may determine whether the button 210 is pressed or toggled. The button 210 may be configured as, for example, a mechanical or electronic switch, without being limited thereto.

The touch pad 220 is installed on the outside of the input apparatus 20 to be touched by the user. The touch pad 220 transmits corresponding information to the second controller 240 according to user manipulation, such as a touch motion made by a user on a predetermined position of a surface of the pad or a drag motion made by a user in a predetermined direction or a predetermined distance. The corresponding information includes a coordinate of a touched position corresponding to a touch motion, a moving direction or a moving distance corresponding to a drag motion, etc.

The touch pad 220 may be provided in various configurations to detect a touched position on the surface thereof, for example, a pressure-sensitive type to detect applied pressure or an electrostatic type to detect change in charge level. Touch pad 220 may be a touchscreen which includes a display. Button 210 may be a physical button or a predetermined input of a touch pad. For example, button 210 may be a designated area of touch pad 220.

The second communication unit 230 transmits a control signal or a command transmitted from the second controller 240 to the first communication unit 140. To this end, the second communication unit 230 may be provided in accordance with a communication protocol corresponding to the first communication unit 140. The second communication unit 230 may be provided not only to perform one-way transmission to the first communication unit 140 but also to perform two-way communication with the first communication 140.

The second controller 240 generates a control signal corresponding to an input operation through the button 210 or the touch pad 220 when user manipulation occurs via the button 210 or the touch pad 220. The second controller 240 transmits the generated control signal to the second communication unit 230, so that the display apparatus 100 performs a control operation corresponding to the control signal.

With this configuration, the display system 1 performs an image display control process as follows.

The display apparatus 100 provides various operational functions, such as selection of a broadcast channel or an image display mode, and displays a user interface (UI) image corresponding to a function. The UI image includes at least one item designating a setting of the function, and the user may select any one item through the input apparatus 200 while the UI image is displayed. The display apparatus 100 adjusts the setting of the function to a set value corresponding to the selected item.

Here, at least one item is included in the UI image and is an object provided to be selected by the user through the input apparatus 200. Each item is provided corresponding to a setting state of each of various functions and services offered by the display apparatus 100. When the user selects any one item from the UI image and confirms the selection, the display apparatus 100 transitions from a current state of the display apparatus to a setting state preset corresponding to the selected item.

In detail, for example, when the UI image is a broadcast channel list, each item of the UI image corresponds to each available broadcast channel number. When the user selects any one item on the broadcast channel list, the display apparatus 100 displays an image of a broadcast channel number corresponding to the selected item.

In a general method of controlling a display of an UI image on the display apparatus 100 by the user using the input apparatus 200, user manipulations via the button 210 and the touch pad 220 of the input apparatus 200 are distinguished from each other. For example, when a function of the display apparatus 100 is requested through the button 210, the display apparatus 100 displays an image related to the function, and the user controls, for example, movement of a pointer in the image using the touch pad 220.

In this case, however, there is no connected manipulation between the button 210 and the touch pad 220, and thus the touch pad 220 may be utilized within a limited range. Thus, in the present exemplary embodiment, efficiency of the input apparatus 200 manipulated by the user may be improved by combining features of the physical or mechanical component, the button 210, and features of the touch pad 220 which enables a drag motion, e.g., by the user rubbing the surface.

Hereinafter, operations of the display apparatus 100 and the input apparatus 200 according to the present exemplary embodiment will be described.

When the user presses a physical button 210 of the input apparatus 200, a function performed by the button 210, which includes a brief operation and a full operation, is configured to retrieve an image or content or to adjust a set value.

When the button 210 is pressed, the display apparatus 100 displays a brief visual user interface (UI) element, i.e., an UI image.

Then, when the user touches the touch pad 220 with the UI element displayed, the UI element is enlarged, enabling the user to actively utilize abundant resources.

For example, manipulation of the button 210 enables a display of only one item of the UI element and toggling of the button 210 enables switch only to a previous or next item, while using the touch pad 220 allows a display of all items of the UI element.

Alternatively, when the user touches the touch pad 220 while displaying the UI element having a function of performing a toggling operation by repeatedly pressing one button 210, all toggled values are displayed and a pointer or cursor is moved bidirectionally, not unidirectionally, thereby making it easy to access a desired value.

With the full UI element displayed, the user drags on the touch pad 220 to scroll through the UI or change a value or taps the touch pad 220 to select an item or value.

Defining action of the user pressing the button 210 as passive manipulation and action of the user touching or dragging the touch pad 220 as active manipulation, the user tends to prefer passive manipulation which is simple when the user has a low interest. In this case, the display apparatus 100 provides a simple and concise UI adequate for the user's interest.

However, when the user has a high interest, the user wants to actively navigate to or set up the display apparatus 100. In this case, the display apparatus 100 provides a UI which is relatively complicated but enables the user to effectively and satisfactorily achieve desired purposes.

In summary, the display apparatus 100 and the input apparatus 200 according to the present exemplary embodiment operate as follow.

When a button 210 of the input apparatus 200 is pressed, the display apparatus 100 displays a brief graphic user interface (GUI) element corresponding to the button 210. Then, when the touch pad 220 of the input apparatus 200 is touched, the display apparatus 100 enlarges the displayed brief GUI element. Here, the enlarged GUI element may be controlled or adjusted by the user using the touch pad 220.

In enlarging the brief GUI element, the display apparatus 100 allows the brief GUI element to be enlarged only when the brief GUI element is displayed after input on the button 210, thereby preventing an error.

The input apparatus 200 may include a pair of buttons 210, e.g., a pair of up and down arrow keys or a pair of left and right arrow keys among four arrow keys. To provide a function of retrieving previous or next content by pressing the pair of buttons 210, when a button 210 is pressed, the display apparatus 100 displays a graphic element associated with content simultaneously with switching to the content, and then offers an enlarged content list for retrieval of the content when the touch pad 220 is touched.

Further, when the buttons 210 in the pair to increase or decrease a value are pressed, the display apparatus 100 displays a graphic element presenting a set value. Then, when the touch pad 220 is manipulated, the display apparatus 100 displays an enlarged GUI to adjust the value.

To provide a function of changing a value by repeatedly pressing the same button 210, when the button 210 is pressed, the display apparatus 100 displays a graphic element presenting a value currently set in the display apparatus 100. Then, when the touch pad 220 is touched, the display apparatus 100 displays a list of all values so that the user may change the value using the touch pad 220.

Hereinafter, the exemplary embodiment will be described in detail.

When a signal corresponding to a first input is received from the input apparatus 200 by manipulation of the button 210, the display apparatus 100 according to the present exemplary embodiment displays a first item related to a current setting state of the display apparatus 100. Then, when a signal corresponding to a second input is received from the input apparatus 200 through the touch pad 220, the display apparatus 100 displays at least one second item to be selectable in order to change the current setting state.

In detail, when a preset first input is made by the button 210 of the input apparatus 200, the display apparatus 100 displays a first UI image. Then, when a preset second input is made through the touch pad 220 of the input apparatus 200 with the first UI image displayed, the display apparatus 100 switches to a second UI image that is functionally enhanced as compared with the first UI image.

Here, the first UI image includes a first item, and the second UI image includes the first item and at least one second item. In other words, the second UI image includes a plurality of items and the first UI image includes part of the items. In this case, when input is made by manipulating the button 210, the display apparatus 100 displays the first UI image. Then, when input is made by manipulating the touch panel 220 with the first UI image displayed, the display apparatus 100 switches from the first UI image being currently displayed to the second UI image.

The first UI image includes part of the items included in the second UI image, and an item included in the first UI image corresponds to the current setting state of the display apparatus 100. In this way, the second UI image includes a functionally enhanced interface as compared with the first UI image.

Accordingly, efficiency of input manipulation by the user through the button 210 and the touch pad 220 may be improved.

Figure 3:
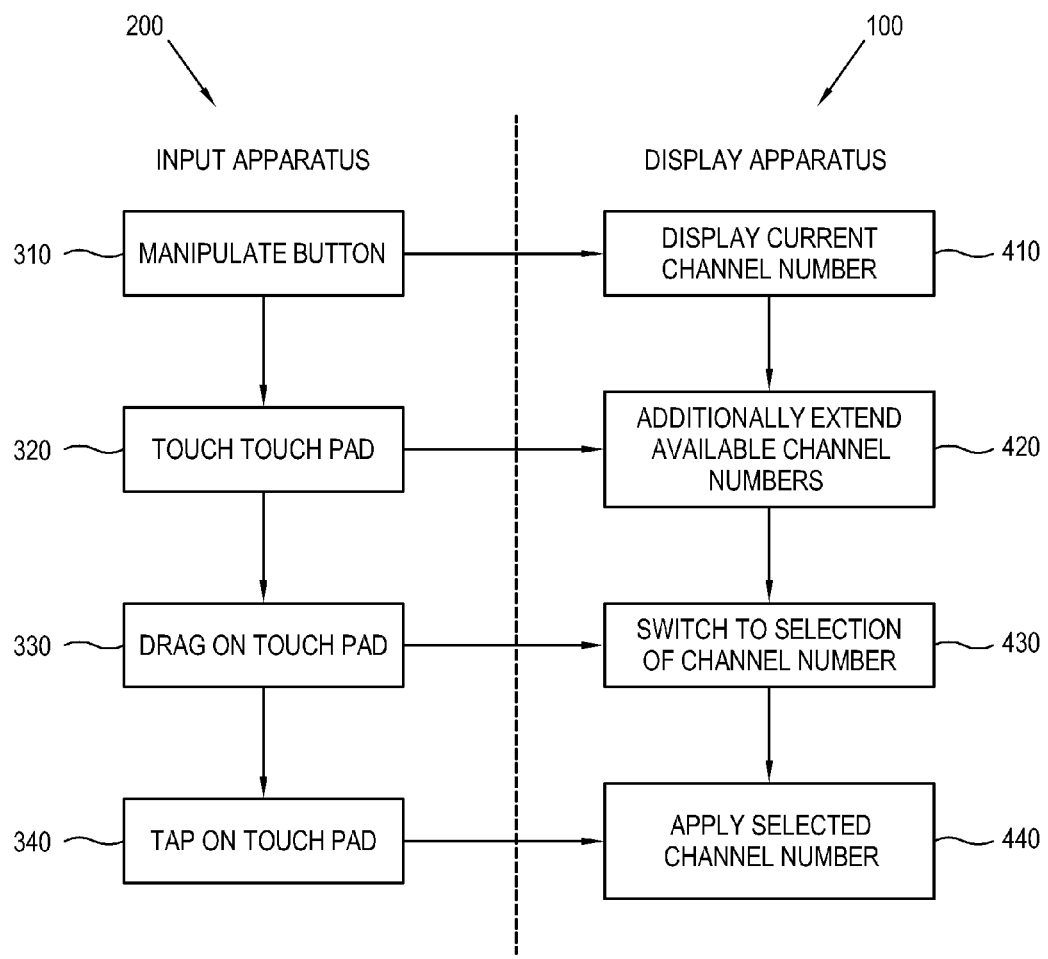
FIG. 3 is a flowchart illustrating a process of changing a channel of a display apparatus according to manipulation of an input apparatus in the display system of FIG. 1.

Hereinafter, a method of changing broadcast channels according to an exemplary embodiment will be described with reference to FIG. 3. FIG. 3 is a flowchart illustrating a process of changing broadcast channels in the display apparatus 100 by manipulation of the input apparatus 200.

As shown in FIG. 3, when the button 210 of the input apparatus 200 is manipulated by the user with an image of a first channel being displayed on the display apparatus 100 (310), the display apparatus 100 displays a UI image including a channel number of the first channel, of which the image is displayed on the display apparatus 100 (410). Here, this UI image corresponds to the first UI image described above.

While the button 210 is manipulated, i.e., the user is pressing the button 210, the display apparatus 100 continues to display the channel number of the first channel.

Then, when the touch pad 220 is touched by the user while the button 210 is manipulated by the user or the display apparatus 100 displays the UI image including the channel number of the first channel (320), the display apparatus 100 displays an enhanced UI image further including available channel numbers to be displayed by the display apparatus 100 together with the first channel (420). This UI image corresponds to the foregoing second UI image, and the available channel numbers of the second UI image correspond to the items described above.

That is, as the button 210 is manipulated, the first UI image is displayed. Then, as the touch pad 220 is touched with the first UI image displayed, the first UI image is changed to the second UI image.

When the user drags on the touch pad 220 with the second UI image displayed (330), the display apparatus 100 switches channel numbers to select a channel based on a dragging direction and distance (430).

When the user taps on the touch pad 220 with the channel number selected (340), the display apparatus 100 applies the selected channel number and displays an image corresponding to the channel (440). Here, a tap refers to an action of a user briefly touching the touch pad 220.

In this way, connected operations of the button 210 and the touch pad 220 of the input apparatus 200 enable a switch to a display of the second UI image that is an enhanced interface of the first UI image while the first UI image is displayed on the display apparatus 100.

Hereinafter, a UI image displayed on the display apparatus 100 based on manipulation of the input apparatus 200 according to an exemplary embodiment will be described with reference to FIGS. 4 to 6. In the present exemplary embodiment, the input apparatus 200 and the display apparatus 100 operate in the same manner as described above with reference to FIG. 3.

Figure 4:
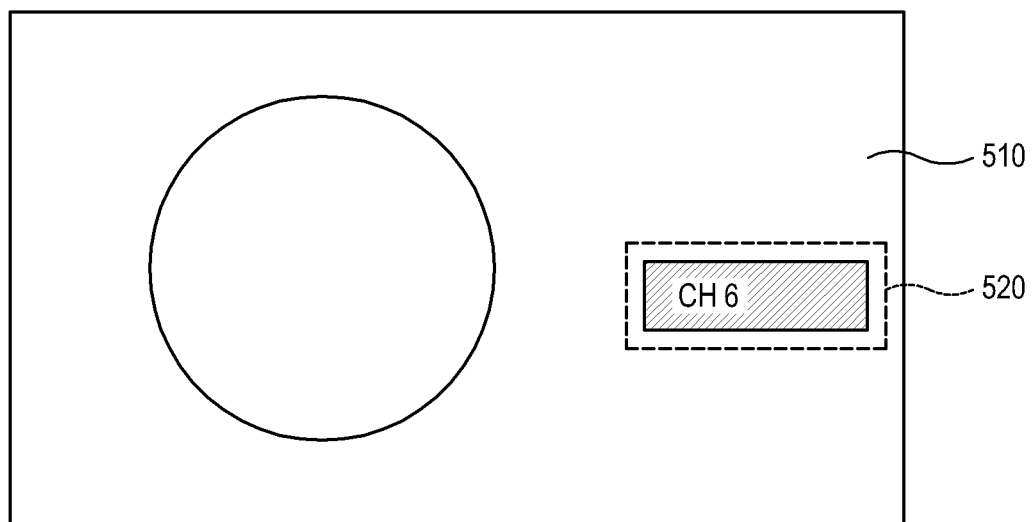
FIG. 4 shows a first user interface (UI) image displayed by pressing a button of the input apparatus in the display system of FIG. 1 according to an exemplary embodiment.

FIG. 4 shows a first UI image 520 displayed when the button 210 of the input apparatus 200 is pressed according to an exemplary embodiment.

As shown in FIG. 4, when a user presses the button 210 with an image 510 of CH6 displayed on the display apparatus 100, the display apparatus 100 displays the first UI image 520 presenting a channel number of the image 510 being currently displayed, CH6.

Figure 5:
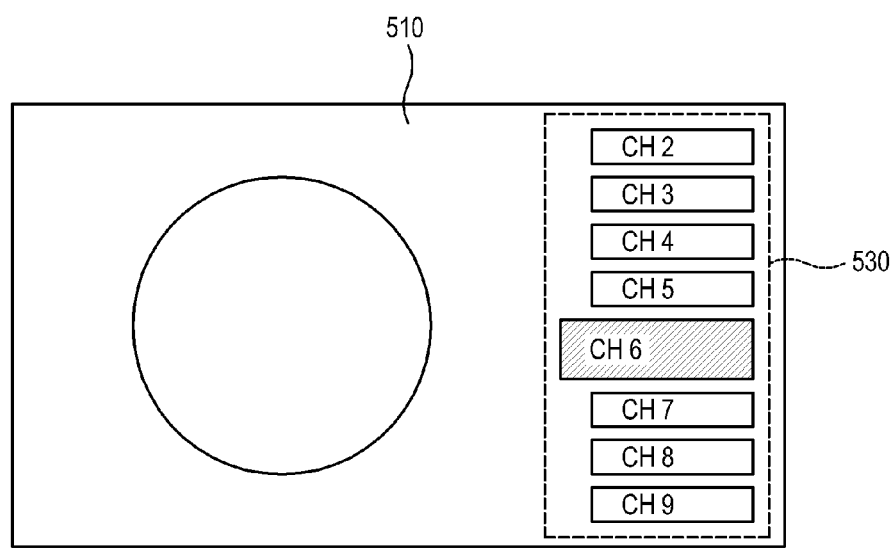
FIG. 5 shows a second UI image displayed by touching a touch pad with the first UI image displayed as shown in FIG. 4.

FIG. 5 shows a second UI image 530 displayed when the touch pad 220 is touched with the first UI image 520 displayed.

As shown in FIG. 5, when the user touches the touch pad 220 with the first UI image 520 displayed, the display apparatus 100 additionally extends to items of available channel numbers, CH2, CH3, CH4, CH5, CH7, CH8 and CH9, with respect to a currently displayed item, CH6, switching to the second UI image 530.

Among the items included in the second UI image 530, CH2, CH3, CH4, CH5, CH7, CH8 and CH9, the display apparatus 100 displays the item corresponding to the currently displayed image 510, CH6, as a selection. The selection may be represented by highlighting the item, indicating the item with a cursor, or sizing the item distinguishably.

Figure 6:
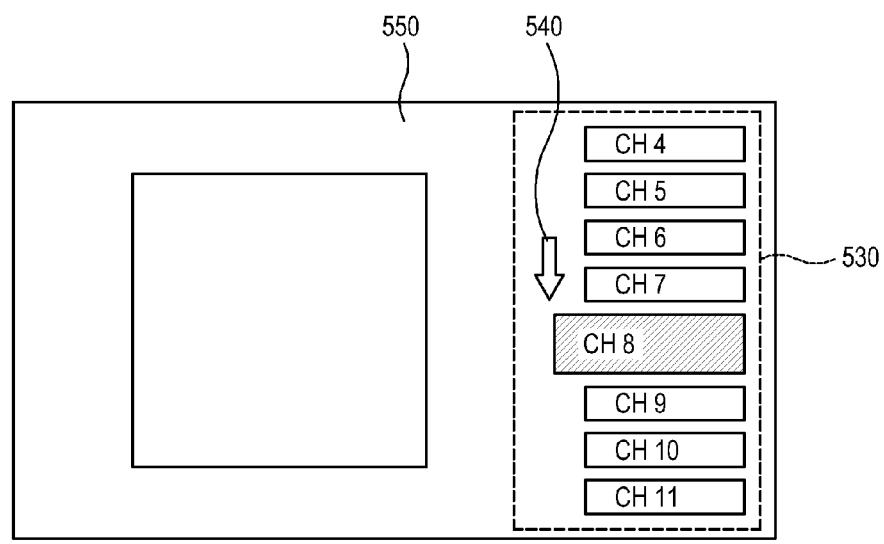
FIG. 6 shows a switch between selected items based on a drag motion on the touch pad with the second UI image displayed as shown in FIG. 5.

FIG. 6 shows a switch between selected items based on a drag motion on the touch pad 220 with the second UI image 530 displayed.

As shown in FIG. 6, when the user makes a drag motion on the touch pad 220 with the second UI image 530 displayed, the display apparatus 100 scrolls 540 the items based on the currently selected item CH6. In accordance with the scrolling, the selection is switched to any one item among a plurality of items, CH4, CH5, CH6, CH7, CH8, CH9, CH10 and CH11, as shown in FIG. 6. That is, the selected item is switched from CH6 to CH8 in the second UI image 530.

In this state, when the user taps on the touch pad 220, the display apparatus 100 determines that the selection of the currently selected item CH8 is made and switches to an image 550 of CH8 displayed.

The button 210 is not limited to a particular kind in the foregoing exemplary embodiments and its characteristics or types do not limit the scope of the present exemplary embodiments. For example, the button 210 may be configured to move a cursor up and down or side to side by toggling, and a user presses the up-and-down button so that the display apparatus 100 displays the first UI image 520. Alternatively, the input apparatus 200 may have a designated hot-key to display the first UI image.

Figure 7:
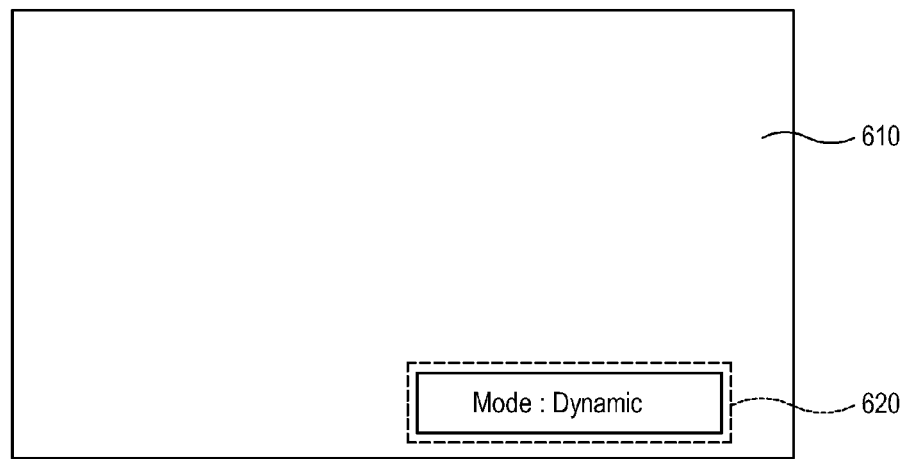
FIG. 7 shows a first UI image displayed by toggling the button of the input apparatus in the display system of FIG. 1 according to another exemplary embodiment.

Meanwhile, the foregoing exemplary embodiment illustrates a process of changing channel numbers but may be modified variously. FIG. 7 shows a first UI image 620 displayed on the display apparatus 100 according to another exemplary embodiment.

As shown in FIG. 7, when a user toggles the button 210 with an image 610 displayed, the display apparatus 100 displays the first UI image 620 including an item presenting a display mode of the current image 610. For example, if an image display mode is classified into sports, movie, dynamic and standard modes and the current display mode is a dynamic mode, the first UI image 620 includes an item presenting the dynamic mode only.

Figure 8:
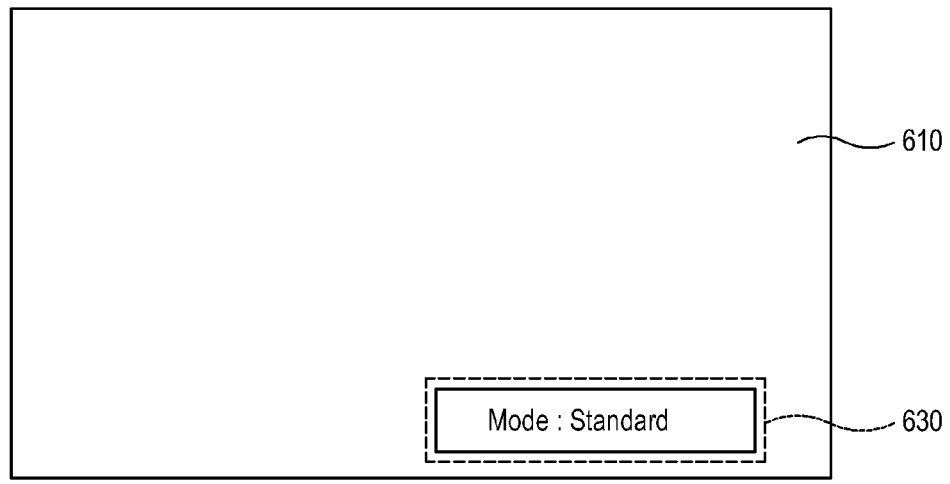
FIG. 8 shows change of the first UI image when a user repeatedly toggles the button with the first UI image displayed as shown in FIG. 7.

FIG. 8 shows change to another first UI image 630 when the user toggles the button 210 again with the first UI image 620 displayed as shown in FIG. 7.

As shown in FIG. 8, when the user toggles the button 210 again with the first UI image 620 (in FIG. 7) displayed, the display apparatus 100 switches to an item in a different mode from the dynamic mode, e.g., a standard mode, in the first UI image 630 accordingly. That is, the item included in the first UI image may be switched based on toggling of the button 210.

Figure 9:
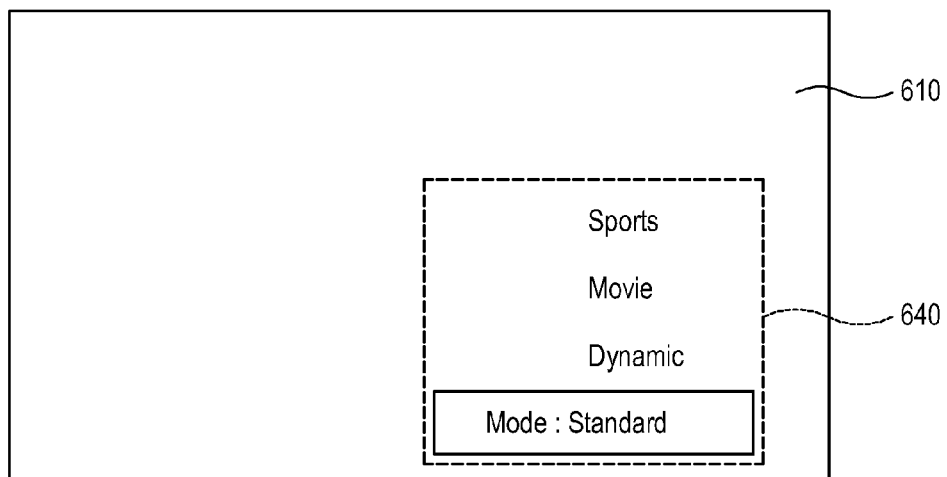
FIG. 9 shows a second UI image displayed when the user touches the touch pad with the first UI image displayed as shown in FIG. 8.

FIG. 9 shows a second UI image 640 displayed when the user touches the touch pad 220 with the first UI image 630 displayed.

As shown in FIG. 9, when the user touches the touch pad 220 with the first UI image 620 of FIG. 7 or the first UI image 630 of FIG. 8 displayed, the display apparatus 100 displays the second UI image 640 including a plurality of items corresponding to a plurality of image display modes, e.g., sports, movie, dynamic and standard modes.

Then, when the user drags up and down on the touch pad 220 with the second UI image 640 displayed, the display apparatus 100 can switch to any one selected among the items corresponding to the drag motion.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. A display apparatus comprising:
a display unit;
an image processor configured to process an image signal to display an image on the display unit and configured to display a UI menu item;
a communication unit configured to communicate with an input apparatus, the input apparatus comprising a button and a touch pad; and
a controller configured:
to control the image processor to display a part of a plurality of UI menu items which correspond to one of a plurality of functions of the display apparatus, in response to a first input by manipulation of the button from the input apparatus; and
to display the plurality of UI menu items to select one of the plurality of UI menu items, in response to a second input from the input apparatus through the touch pad while the part of the plurality of UI menu items is being displayed.

2. The display apparatus of claim 1, wherein the controller switches a selection from a first UI menu item to a second UI menu item from among the plurality of UI menu items in response to a drag motion on the touch pad by a user while the plurality of UI menu items is displayed.

3. The display apparatus of claim 2, wherein the controller applies the selection in response to a third input from the input apparatus through the touch pad.

4. The display apparatus of claim 3, wherein the controller performs a preset control operation of the display apparatus in response to the applying the selection of any one of among the first UI menu item and the second UI menu item.

5. The display apparatus of claim 1, wherein the controller continues to display the part of the plurality of UI menu items while the input apparatus is manipulated by the user.

6. The display apparatus of claim 1, wherein the second input is made through a touch motion of the user on the touch pad.

7. The display apparatus of claim 1, wherein a first UI menu item corresponding to the part of the plurality of UI menu items is displayed on a different portion of the display unit than a second UI menu item different the first UI menu item from among the plurality of UI menu items.

8. The display apparatus of claim 1, wherein a first UI menu item displayed due to the manipulation of the input apparatus is a current input selection, and
wherein the plurality of UI menu items displayed due to the second input to the touch pad comprises a alternative input selection and is displayed on the display unit with the first UI menu item.

9. The display apparatus of claim 1, wherein when the input apparatus is manipulated a second time before the second input of the touch pad, the controller which controls the image processor to display the part of the plurality of UI menu items changes the current setting state to a new current setting state.

10. A control method of a display apparatus comprising:
communicating with an input apparatus comprising a button and a touch pad;
displaying a part of a plurality of UI menu items which correspond to one of a plurality of functions of the display apparatus, in response to a first input by manipulation of the button from the input apparatus; and
displaying the plurality of UI menu items to select one of the plurality of UI menu items, in response to a second input from the input apparatus through the touch pad while the part of the plurality of UI menu items is being displayed.

11. The control method of claim 10, further comprising switching from a first UI menu item to a second UI menu item from among the plurality of UI menu items in response to a drag motion on the touch pad by a user while the plurality of UI menu items is displayed.

12. The control method of claim 11, further comprising applying the selection in response to a third input from the input apparatus through the touch pad.

13. The control method of claim 11, further comprising performing a preset control operation of the display apparatus in response to the applying the selection of any one of among the first UI menu item and the second UI menu item.

14. The control method of claim 10, wherein the displaying the part of the plurality of UI menu items comprises continuing to display the part of the plurality of UI menu items while the input apparatus is manipulated by the user.

15. The control method of claim 10, wherein the second input is made through a touch motion of the user on the touch pad.

16. An input apparatus of a display apparatus comprising:
an input unit comprising a button and a touch pad;
a communication unit configured to communicate with the display apparatus; and
a controller configured:
to transmit a first signal through the communication unit to display on the display apparatus a part of a plurality UI menu items which correspond to one of a plurality of functions of the display apparatus, in response to a first input by manipulation of the button from the input apparatus; and
to transmit a second signal through the communication unit to display on the display apparatus the plurality of UI menu items to select one of the plurality of UI menu items, in response to a second input made through the touch pad while the part of the plurality of UI menu items is being displayed on the display apparatus according to the first input.

17. A display system comprising:
a display apparatus; and
an input apparatus comprising a button and a touch pad and transmitting a preset control signal to control an operation of the display apparatus according to manipulation of the touch pad,
wherein a part of a plurality of UI menu items which correspond to one of a plurality of functions of the display apparatus is displayed on the display apparatus in response to a first input by manipulation of the button from the input apparatus, and the plurality of UI menu items is displayed on the display apparatus to select one of the plurality of UI menu items, in response to a second input through the touch pad while the part of the plurality of UI menu items is being displayed on the display apparatus.

* * * * *